United States Patent
Bodin

(10) Patent No.: US 6,186,525 B1
(45) Date of Patent: Feb. 13, 2001

(54) SUSPENSION FOR A NON-DRIVEN STEERABLE VEHICLE WHEEL

(75) Inventor: Jan-Olof Bodin, Alingsås (SE)

(73) Assignee: Volvo Lastvagnar AB, Gothenburg (SE)

( * ) Notice: Under 35 U.S.C. 154(b), the term of this patent shall be extended for 0 days.

(21) Appl. No.: 09/402,800

(22) PCT Filed: Apr. 9, 1998

(86) PCT No.: PCT/SE98/00666

§ 371 Date: Nov. 2, 1999

§ 102(e) Date: Nov. 2, 1999

(87) PCT Pub. No.: WO98/45158

PCT Pub. Date: Oct. 15, 1998

(30) Foreign Application Priority Data

Apr. 10, 1997 (SE) .................................................. 9701327

(51) Int. Cl.[7] .................................................. B62D 7/18
(52) U.S. Cl. ........................ 280/93.512; 280/124.125
(58) Field of Search ....................... 280/93.512, 124.125; 301/132

(56) References Cited

U.S. PATENT DOCUMENTS

| | | | |
|---|---|---|---|
| 3,441,288 | * 4/1969 | Boughner | 280/93.512 |
| 3,477,771 | * 11/1969 | Herbenar | 280/93.512 |
| 4,635,952 | * 1/1987 | Smith | 280/96.1 |
| 4,915,530 | * 4/1990 | Tomlinson | 403/158 |
| 6,029,986 | * 2/2000 | Bodin et al. | 280/93.512 |

FOREIGN PATENT DOCUMENTS 25 48 227  5/1976 (DE) .
28 47 035  4/1980 (DE) .

* cited by examiner

Primary Examiner—Paul N. Dickson
(74) Attorney, Agent, or Firm—Young & Thompson

(57) ABSTRACT

Wheel suspension for a non-driven steerable vehicle wheel, comprising a kingpin (3) fixed in a front wheel beam (1), said kingpin having upper and lower bearings (17, 18), by means of which a wheel spindle (12) is pivotally mounted relative to the beam. The upper bearing is a roller taper bearing and the lower bearing is a journal bearing (18) consisting of an outer sleeve of an elastically deformable plastic material and an inner bearing bushing of a bearing metal.

7 Claims, 1 Drawing Sheet

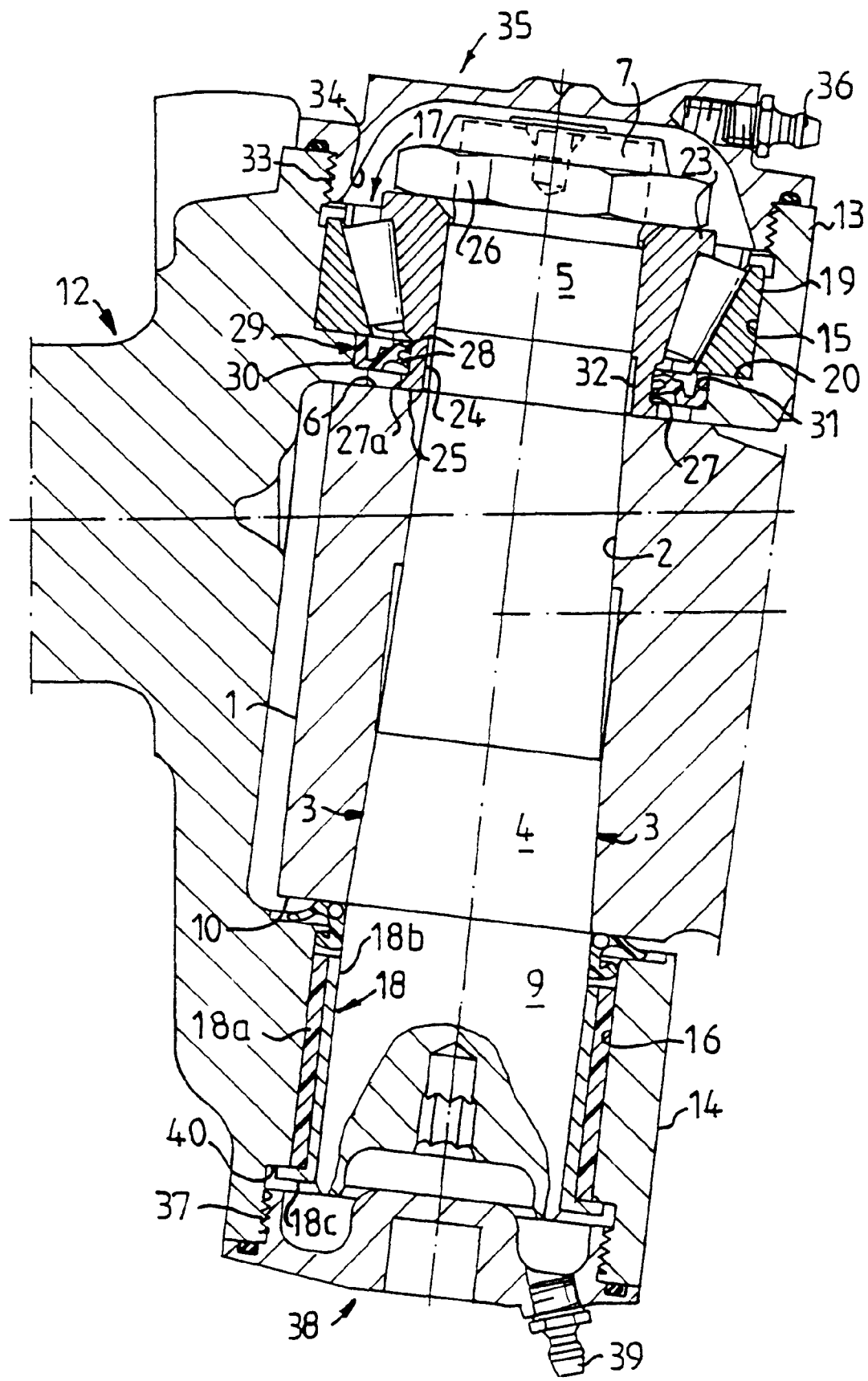

SUSPENSION FOR A NON-DRIVEN STEERABLE VEHICLE WHEEL

BACKGROUND OF THE INVENTION

The present invention relates to a wheel suspension for a non-driven steerable vehicle wheel, comprising an axle member, which at each end has a conical through-bore, which holds a conical central portion of a kingpin, which is provided with kingpin ends extending outside the bore into the member, and a spindle unit, having, firstly, spaced upper and lower spindle ears holding bearings into which the kingpin ends extend and of which the upper bearing is a roller bearing and the lower bearing is a journal bearing, and, secondly, an axle end on which a wheel hub is intended to be mounted.

The most common type of steering knuckle arrangement for trucks has the spindle unit mounted in a taper roller bearing at the upper end of the kingpin and a journal bearing at its lower end. The upper bearing takes up both axial and radial forces while the lower bearing only takes up radial forces. In such a spindle bearing, the axial force on the upper bearing is load-dependent, i.e. the axial load on the bearing varies with the total weight of the vehicle. When taking a curve, the radial forces on the lower bearing from the kingpin will be such that they strive to tip the lower bearing bushing in its seat in the lower spindle ear. Since the bushing is forced into its seat and the kingpin is mounted with the minimum possible play in the bushing, the bushing cannot even out the force couples which apply an asymmetric load. This results in the upper and lower areas of the bearing race being subjected to radial forces and greater wear than the middle portion, and this in turn can lead to gaps occurring after a relatively short time when driving with heavy loads on winding roads.

SUMMARY OF THE INVENTION

The purpose of the present invention is to achieve a wheel suspension of the type described by way of introduction with a lower kingpin bearing which has a longer life than previously known bearings of the type in question.

This is achieved according to the invention by virtue of the fact that the journal bearing comprises an outer sleeve of an elastically deformable material, which is non-rotatably fixed in a bearing seat in the lower spindle ear, and an inner bearing sleeve of a bearing metal, which is non-rotatably fixed in the outer sleeve.

The elastic sleeve allows the bearing sleeve, when obliquely loaded from the kingpin when the truck takes a curve when heavily loaded, to be tipped somewhat in the bearing seat so that the center axis of the bearing sleeve will intersect the center axis of the bearing seat approximately at their midpoints, resulting in a reduction of the forces acting on the end portions of the bearing sleeve. The result will be a reduction of wear at the end portions and an extension of the total life of the lower kingpin bearing.

BRIEF DESCRIPTION OF THE FIGURE

The invention will be described in more detail below with reference to an example shown in the accompanying drawing, where the FIGURE shows a longitudinal section through a wheel suspension according to the invention for a truck front wheel.

DETAILED DESCRIPTION OF THE INVENTION

In the FIGURE, 1 designates one end of a front member in a motor vehicle. The member 1 has a bore 2 of truncated conical shape along most of its length. A kingpin, generally designated 3, has its middle portion 4, with the same conicity as the bore 2, fixed in the bore. An upper cylindrical kingpin end 5 extends above an upper end surface 6 of the member 1 and has a threaded portion 7 at its very end. A corresponding lower cylindrical kingpin end 9, but without the threaded portion at the very end, extends below a lower end surface 10 on the member 1.

A wheel spindle, generally designated 12, has an upper spindle ear 13 and a lower spindle ear 14, which are each made with an individual bearing seat 15 and 16, respectively, for an upper taper roller bearing 17 and a lower journal bearing 18, respectively, which consists of an outer sleeve 18a of an elastically deformable plastic material and an inner sleeve 18b of a bearing metal. The upper bearing rests with its outer ring 19 against an upwardly facing surface 20 of the upper bearing seat 15. The upper kingpin end 5 protrudes into the inner ring 23 of the upper bearing 17, which is made in one piece with a spacer sleeve 24, which abuts against the upwardly facing surface 6 of the member 1 with an end surface 25. By tightening a nut 26 screwed onto the threaded portion 7, the bearing ring 23 is clamped with its spacer sleeve 24 against the member 1 and is rotationally fixed. The lower kingpin end 9 protrudes into the inner bearing sleeve 18b of the lower journal bearing 18. Its outer sleeve 18a is pressed into the bearing seat 16 in the lower spindle ear 14. The axial position of the bearing 18 in the seat 16 is determined by a flange 18c on the inner bearing sleeve 18b, said flange forming an abutment against an end surface 40 on the lower spindle ear 14. The outer sleeve 18a is suitably glued or welded to the inner bearing sleeve 18b. The sleeves, during assembly, are pressed as a unit into the bearing seat 16 of the lower spindle ear 14. The flange 18c also forms an end abutment against one end surface of the elastic sleeve 18a when the sleeves 18a and 18b are put together.

The outer cylindrical surface of the spacer sleeve 24 is made with a peripheral groove 27 into which the sealing lips 28 on an elastic sealing ring, generally designated 29, extend and abut with their end surfaces against the bottom of the groove 27. The flange 27a, formed by the groove 27, forms an abutment which keeps the seal in place during assembly. The portion 30 of the sealing ring 29 opposite the sealing lips 28 has an essentially L-shaped cross-sectional profile and is mounted in a seat 31 in the upper spindle ear 13.

The upper spindle ear 13 has an inner threaded portion 33 above the bearing seat 15, into which an externally threaded flange 34 on a cover 35 is screwed, so that a space sealed off by the sealing ring 29 and the cover 35 is formed for lubricant. The cover 35 is provided with a laterally directed grease nipple 36. The entry of the thread is selected so that the grease nipple 36, after the cover has been screwed down, will assume a predetermined position in which it is easily accessible during service.

The lower spindle ear 14 has a corresponding internally threaded portion 37, into which an externally threaded cover 38 with a grease nipple 39 is screwed.

What is claimed is:
1. Wheel suspension for a non-driven steerable vehicle wheel, comprising an axle member, which at each end has a conical through-bore, which holds a conical central portion of a kingpin, which is provided with kingpin ends extending outside the bore into the member, and a spindle unit, having, firstly, spaced upper and lower spindle ears holding bearings into which the kingpin ends extend and of which the upper bearing is a roller bearing and the lower bearing is a journal bearing, and, secondly, an axle end on which a wheel hub is intended to be mounted, characterized in that the journal bearing (18) comprises an outer sleeve (18a) of an elastically deformable material, which is non-rotatably fixed in a bearing seat (16) in the lower spindle ear (14) and an inner bearing sleeve (18b) of a bearing metal, which is non-rotatably fixed in the outer sleeve.

2. Wheel suspension according to claim 1, characterized in that the inner bearing sleeve (18b) is provided with a radially outwardly directed flange (18c), which forms an abutment surface in contact with a surface (40) on the lower spindle ear (14).

3. Wheel suspension according to claim 1, characterized in that the outer sleeve (18a) is a plastic sleeve, which is force-fitted into the bearing seat (16).

4. Wheel suspension according to claim 2, characterized in that the outer sleeve (18a) has an end surface abutting against said abutment surface on the bearing sleeve.

5. Wheel suspension according to claim 1, characterized in that the outer sleeve (18a) and the bearing sleeve (18b) are adhesively fixed to each other.

6. Wheel suspension according to claim 2, characterized in that the outer sleeve (18a) is a plastic sleeve, which is force-fitted into the bearing seat (16).

7. Wheel suspension according to claim 6, characterized in that the outer sleeve (18a) has an end surface abutting against said abutment surface on the bearing sleeve.

* * * * *